United States Patent [19]

Betz

[11] Patent Number: 5,481,940
[45] Date of Patent: Jan. 9, 1996

[54] PISTON AND CYLINDER UNIT FOR USE IN A VEHICLE SAFETY BELT PRETENSIONER

[75] Inventor: Hans-Peter Betz, Böbingen, Germany

[73] Assignee: TRW Repa GmbH, Alfdorf, Germany

[21] Appl. No.: 219,942

[22] Filed: Mar. 29, 1994

[30] Foreign Application Priority Data

Apr. 2, 1993 [DE] Germany .............................. 9305086 U

[51] Int. Cl.$^6$ .................................................. B60R 22/46
[52] U.S. Cl. .......................... 74/502.6; 280/806; 297/480
[58] Field of Search ......................... 74/500.5, 501.5 H, 74/502.6; 280/806; 297/478, 479, 480; 60/635

[56] References Cited

U.S. PATENT DOCUMENTS

| | | | |
|---|---|---|---|
| 4,008,780 | 2/1977 | Bendler et al. | ...................... 280/806 X |
| 4,091,621 | 5/1978 | Patrichi | ....................... 60/635 |
| 4,152,025 | 5/1979 | Bendler et al. | ...................... 280/806 X |
| 4,458,921 | 7/1984 | Chiba et al. | .............................. 280/806 |
| 5,207,618 | 5/1993 | Nishizawa | ........................... 280/806 X |
| 5,358,275 | 10/1994 | Föhl | ........................................ 280/806 |

FOREIGN PATENT DOCUMENTS 2809587  9/1978  Germany .............................. 297/480

Primary Examiner—Richard M. Lorence
Attorney, Agent, or Firm—Tarolli, Sundheim & Covell

[57] ABSTRACT

A piston and cylinder unit for use in a vehicle safety belt pretensioner is provided with a tubular cylinder and a piston slidably accomodated in the cylinder tube. The piston has a circumferential groove between a pair of axially spaced radial shoulders. A cable is connected to the piston. A pair of semi-annular disks are located in said the circumferential groove of the piston with circumferential ends bearing on each other. The semi-annular disks are held in positions with opposite oblique slope in relation to the central axis of the cylinder tube. An outer edge portion of each semi-annular disk is held in engagement with the inner wall surface of the cylinder tube. When the piston tends to move through the cylinder tube in a direction opposite to an operating stroke, the semi-annular disks are erected and jammed in the cylinder tube to block further movement of the piston.

4 Claims, 1 Drawing Sheet

PISTON AND CYLINDER UNIT FOR USE IN A VEHICLE SAFETY BELT PRETENSIONER

The invention relates to a piston and cylinder unit for use in a vehicle safety belt system comprising a piston in a cylinder tube, a cable which is connected on the one hand with a buckle and on the other hand with the piston.

Belt pretensioners have been proposed in very many different forms and for example the German patent publication 8,900,013.7 U1 discloses a mechanical belt pretensioner, which has two axially moving pistons in one cylinder. Between the pistons secured to the cable a disk-like locking element is arranged, through which the cable is threaded. The piston nearer to the buckle is made oblique at its end facing the other piston and the locking element has at least approximately the same elliptical form and the same dimensions as formed and by the oblique part of the piston nearer to the buckle. On triggering the belt pretensioner the locking element is urged against the oblique surface and the piston is able to be slid in the direction of pretensioning without hinderance. When the direction of movement of the piston is reversed the piston which is remote from the buckle it will urge the locking element towards a position which is perpendicular to the cable with the result that the locking element is urged against the wall of the cylinder and in the case of there being a substantial force will bite into it. The locking element is consequently held so as to prevent any further motion of the piston in a direction opposite to the direction of pretensioning. In this manner a no back device for the piston and cylinder unit is formed.

One object of the present invention is to provide a belt pretensioner of the sort noted initially so improved that on the one hand manufacture is and assembly are simple while on the other hand only a short stroke of the piston is required for triggering the no back device.

In connection with a belt pretensioner of the type initially mentioned this object is to be attained by the invention since the piston has a circumferential groove, in which two semi-annular disks are arranged with an opposite oblique slope in relation to the axis of the piston and so that the circumferential ends bear against one another and on their outer periphery are held in contact with the wall surface of the cylinder. This design in accordance with the invention is characterized by mechanical simplicity and by low manufacturing costs. Owing to the arrangement of the two semi-annular disks a toggle lever effect is obtained, that is to say the two semi-annular disks bear against each other at their ends and when the direction of movement of the piston is reversed after the pretensioning operation, they are moved out of their oblique position and righted following only a minimum control movement and then bite into the wall surface of the cylinder. This gives the advantage that directly on reversal of the direction of the piston the no back device is activated and the piston is locked and the take up of slack in the belt caused by the belt pretensioning operating is maintained.

It is convenient if the peripheral ends of the semi-annular disks are pivotally supported on a radial limiting wall surface of the circumferential groove. In this respect it is more particularly an advantage that the limiting wall surface opposite to the radial limiting wall surface, of the circumferential groove, is slanted obliquely to the axis of the piston. The two semi-annular disks are, during acceleration of the piston, evenly urged against the obliquely sloping limiting wall surface for the pretensioning operation, when the slope of the limiting wall surface respectively corresponds to the slope which is assumed by the semi-annular disk in their opposite oblique position in relation to the axis of the piston.

The no back device may furthermore be employed in a piston, which is a part of a piston and cylinder linear drive for the belt pretensioner. For this it is an advantage if the obliquely sloping limiting wall surface is provided on its outer periphery with a circumferential step, in which an O-seal is arranged, which has its outer periphery in contact with the wall surface of the cylinder and on the side, facing the radial limiting wall, the semi-annular disks are supported in the axial direction. The O-ring seal acts both as a sealing means and also as a spring element, which loads the semi-annular disks against the cylinder bore surface.

Further advantages and further forms of the invention will be understood from the following descriptive disclosure and the drawing.

Figure 2:
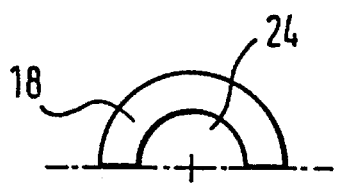
FIG. 2 is a front elevation of a semi-annular disk in accordance with the working embodiment of FIG. 1.
Figure 3:
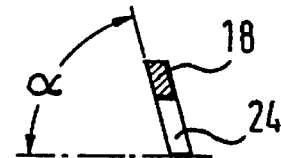

FIG. 3 a cross section taken through the semi-annular disk of FIG. 2.

Figure 1:
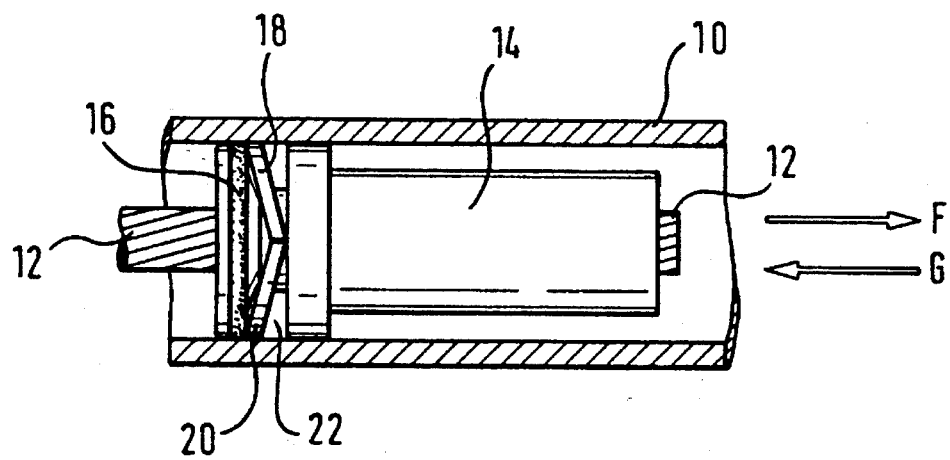
FIG. 1 is a diagrammatic longitudinal section of part of a cylinder with a piston in accordance with one working embodiment of the invention.
Figure 4:
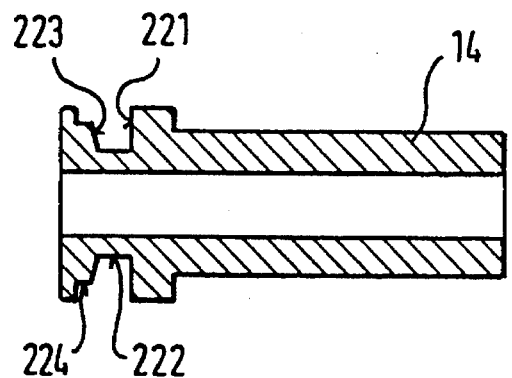

FIG. 4 is a longitudinal section taken through the piston in accordance with the form of the invention of FIG. 1.

In a tubular cylinder 10 with a circular cross section a piston 14 is arranged which is attached to a cable 12. The piston bears an O-ring seal 16 and two semi-annular disks 18 and 20 in an annular peripheral groove 22. The piston 14 is able to be slid in the tubular cylinder 10. The cylinder 10 in the safety belt system is for instance anchored on a vehicle and is part of a piston and cylinder linear drive; a buckle (not illustrated) is connected with the cable 12.

The circumferential groove 22 has in the pretensioning direction F a radial limiting wall surface 221. Following this there is a cylindrical surface 222. In the direction G, that is to say, in the direction opposite to the pretensioning direction F, the circumferential groove 22 has a limiting wall surface 223 which is slanted obliquely in relation to the axis of the piston 14.

The semi-annular disks 18 and 20 are slanted oppositely in relation to the axis of the piston 14 and are arranged so that their peripheral ends pivot against one another and are supported on the limiting wall 221. Owing to the limiting wall 223 the semi-annular disks 18 and 20 are held at an angle α to the axis of the cylinder 10 of approximately 60° in a neutral position as shown in FIG. 3.

On the outer periphery of the limiting wall surface 223 there is a circumferential step 224. In this circumferential step 244 the O-ring seal 16 is received. The O-ring seal 16 has its outer periphery in contact with the wall surface of the cylinder. The semi-annular disks 18 and 20 are supported axially on its side facing the radial limiting wall surface 221.

The front part of the piston 14 has a smaller diameter than the rear part and is crimped on the cable 12. The piston and cylinder unit as shown in FIG. 1 constitutes the linear drive of the belt pretensioner acting on the belt buckle. The piston 14 in the cylinder 10 is acted upon by the gases produced by the pyrotechnic gas generator with the result that the piston 14 is displaced as indicated by the arrow F in the cylinder 10, the cable 12 and consequently the belt buckle connected with it being entrained as well. During a movement of the piston 14 in the pretensioning direction F the semi-annular disks 18 and 20 will remain in their slanting setting. After completion of the belt pretensioning operation the relative forward movement of the belted vehicle occupant will commence, a pulling force being exerted by means of the cable in the direction as indicated by the arrow G in FIG. 1 on the piston 14. When this happens the semi-annular disks 18 and 20 are righted and on one side press against the wall surface of the cylinder 10 and on the other side they come closer and closer together with the pivotal motion. Since the semi-annular disks 18 and 20 bite into the bore of the cylinder the piston 14 is reliably locked in the direction G.

What is claimed is:

1. A piston and cylinder unit for use in a vehicle safety belt pretensioner, comprising a tubular cylinder with an inner wall surface and a central axis, a piston slidably accomodated in said cylinder tube and having a circumferential groove between a pair of axially spaced radial shoulders, a cable connected to said piston and a pair of semi-annular disks located in said groove with circumferential ends bearing on each other, said semi-annular disks being held in positions with opposite oblique slope in relation to said central axis and with an outer edge portion held in engagement with said inner wail surface.

2. The piston and cylinder unit of claim 1, wherein said circumferential ends additionally bear on a first one one of said radial shoulders.

3. The piston and cylinder unit of claim 2, wherein a second one of said radial shoulders has slanting surface portions which are at a slant to said central axis and said semi- annular disks have side surface portions resting against said slanting surface portions.

4. A piston and cylinder unit for use in a vehicle safety belt pretensioner, comprising a tubular cylinder with an inner wall surface and a central axis, a piston slidably accommodated in said cylinder tube and having a circumferential groove between a pair of axially spaced radial shoulders, a cable connected to said piston and a pair of semi-annular disks located in said groove with circumferential ends bearing on each other, said semi-annular disks being held in positions with opposite oblique slope in relation to said central axis and with an outer edge portion held in engagement with said inner wall surface, a peripheral groove being provided adjacent said second radial shoulder and an O-ring of resilient material being accommodated in said peripheral groove between said second radial shoulder and said pair of semi-annular disks, said O-ring having an outer periphery contacting said inner cylinder wall and said semi-annular disks bearing on said O-ring.

* * * * *